Jan. 20, 1942.　　　　　F. PIERCE　　　　　2,270,766
WELD HEAD SUPPORT AND ALIGNING DEVICE FOR WELDING
Filed July 14, 1939　　　3 Sheets-Sheet 1
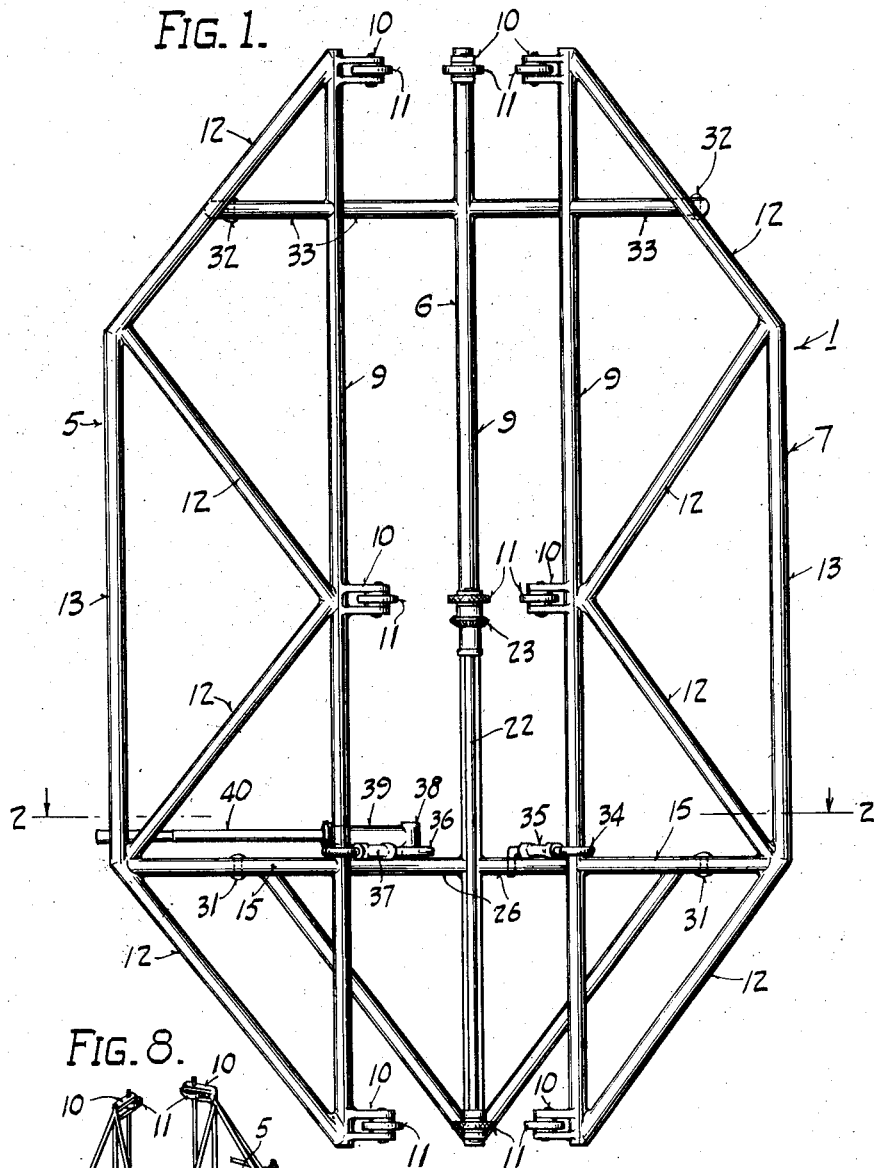
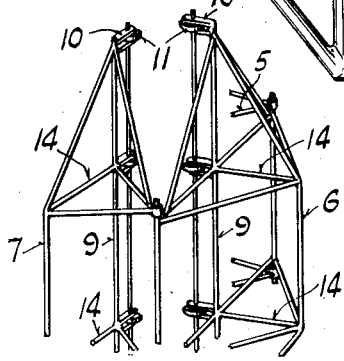
Firth Pierce
INVENTOR.
BY
ATTORNEY.

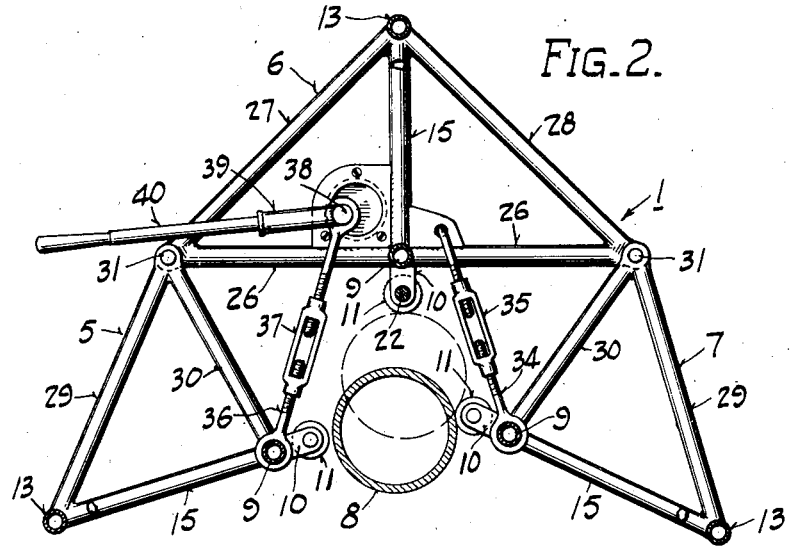
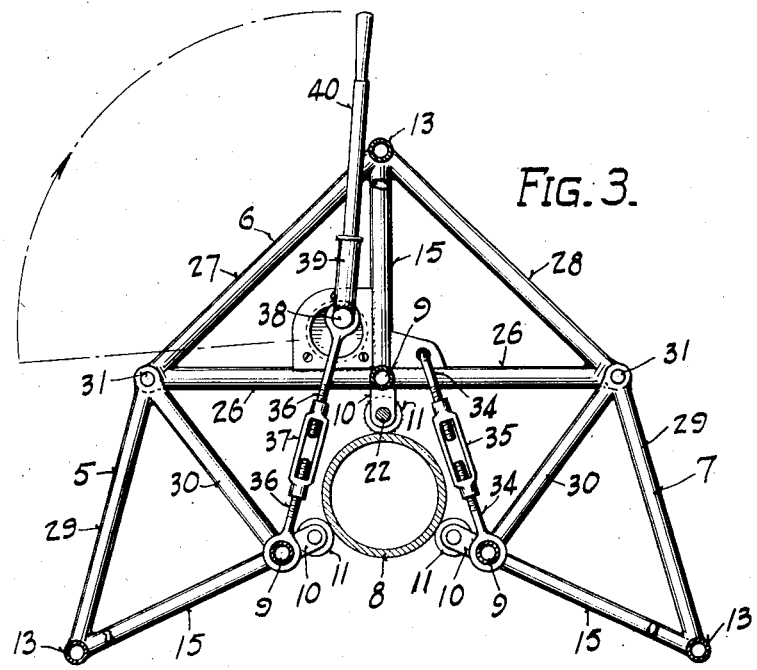

Jan. 20, 1942.  F. PIERCE  2,270,766
WELD HEAD SUPPORT AND ALIGNING DEVICE FOR WELDING
Filed July 14, 1939  3 Sheets-Sheet 3
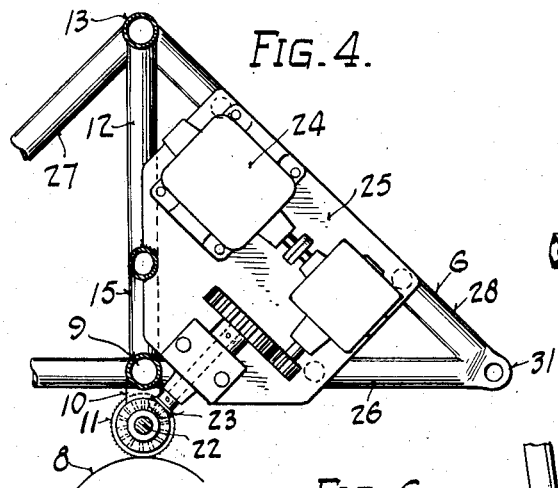
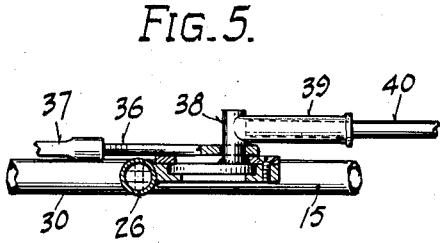
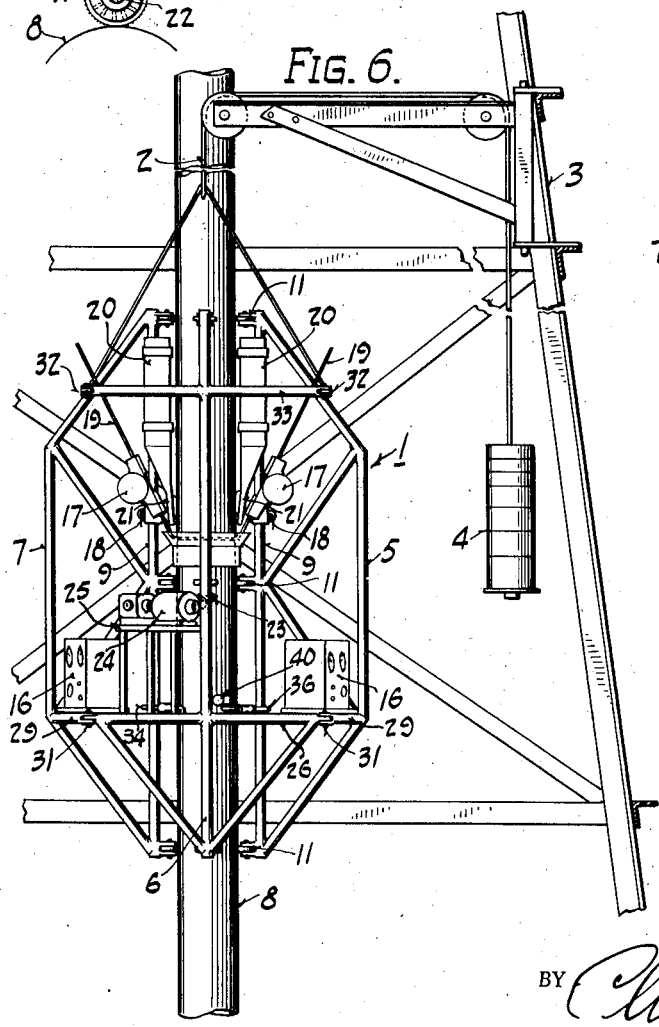
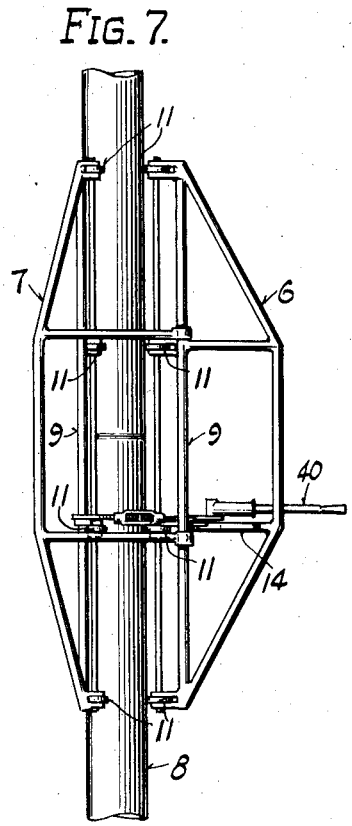
Firth Pierce
INVENTOR.
BY *Chwin C. Andrus*
ATTORNEY.

Patented Jan. 20, 1942

2,270,766

UNITED STATES PATENT OFFICE 2,270,766

WELD HEAD SUPPORT AND ALIGNING DEVICE FOR WELDING

Firth Pierce, East Los Angeles, Calif., assignor to U. C. Murcell, Inc., Los Angeles, Calif., a corporation of California Application July 14, 1939, Serial No. 284,485

10 Claims. (Cl. 113—102)

This invention relates to a weld head support and aligning device for welding, and more particularly to an apparatus for holding automatic welding equipment and aligning the ends of vertically disposed well casing joints for welding the same together.

The commercial welding of casing has been restricted heretofore largely to manual electric arc welding processes, and all attempts to apply automatic welding processes have been unsuccessful due to the inability to properly support the automatic welding head and move the same relative to the seam and the improper alignment of the joints. Such devices as had been proposed were either impractical from the standpoint of time of operation or were too cumbersome and complicated.

The principal object of the present invention is to provide a carrier which will hold the joints of casing in proper alignment and at the same time provide a movable support for an automatic welding head which is moved automatically at a predetermined desired speed around the joints to weld the same.

Another object of the invention is to provide such an apparatus with quick clamping and releasing mechanism to save time in applying it to the casing.

Another object is to provide such an apparatus with adjustable jaws for receiving different size casing.

Another object is to provide such an apparatus with roller clamping means so that it may rotate circumferentially of the casing and carry the weld head around the joint to be welded.

Another object is to provide such an apparatus with means for rotating it around the casing while holding the casing joints in alignment for welding.

Other objects and advantages will appear hereinafter in connection with the description of a preferred embodiment of the apparatus which is illustrated in the accompanying drawings.

In the drawings:

Figure 1 is a front elevation of the apparatus;

Fig. 2 is a transverse section on line 2—2 of Fig. 1, showing a joint of casing being inserted;

Fig. 3 is a section similar to Fig. 2 showing the apparatus in clamping position;

Fig. 4 is a detail horizontal section showing the motor and drive for rotating the apparatus;

Fig. 5 is a detail broken section showing the eccentric clamping means;

Fig. 6 is a rear elevation showing the mounting of the apparatus on a casing and the welding equipment mounted on the apparatus;

Fig. 7 is a side elevation showing a modified form of frame; and

Fig. 8 is a perspective view of the modified form shown in Fig. 7, parts being broken away.

In accordance with the invention the apparatus comprises a frame I which is supported by a cable 2 from the derrick 3 at the well, and is preferably counterweighted as by the weight 4 so that it may be raised or lowered with ease to position it relative to the seam to be welded and to prevent its weight from causing it to slip down the casing during welding.

The frame I comprises three vertical truss members 5, 6 and 7, the members 5 and 7 being hinged at one side to opposite sides of the member 6 and serving as jaws for receiving and clamping the casing 8. The truss members may be constructed conveniently of tubing welded together as illustrated or of any other suitable structurable shapes.

Each member has a vertical element 9 extending for the full height of the apparatus and on which are secured suitable bearing lugs 10 for holding the rollers 11 which engage the casing 8. There are preferably three rollers 11 on each element 9: one at the top, one at the bottom and one centrally located, all three being in alignment. Four rollers may be provided on each element as illustrated in Fig. 7 in which two of the rollers bear on each casing joint.

In order to stiffen the elements 9 against deflection the truss members have diagonal braces 12 extending substantially radially with respect to the casing and secured to the elements 9 back of each lug 10 and having their outer ends secured to a vertical element 13. The upper and lower braces 12 are diagonal and the central braces 12 are also diagonal in the structure illustrated in Figs. 1 to 6, inclusive. In the structure of Figs. 7 and 8 the horizontal braces 14 strengthen the elements 9 back of the respective rollers. In Figs. 1 to 6 there are horizontal radial braces 15 at the juncture of the lower braces 12 and the lower ends of the elements 13. The horizontal braces 15 provide a simple platform support for welding control devices such as the instrument box 16.

The automatic welding heads 17 are mounted by means of clamps 18 on the upright frame elements 9 and are disposed to feed a weldrod 19 diagonally downward and inward towards the circumferential seam to be welded. In the case of submerged arc welding it may also be desirable to provide flux hoppers 20 clamped onto the elements 9 and having flux feeding tubes 21 extending downwardly to feed flux to the arc.

The entire frame and welding devices are slowly rotated about the casing 8 on the rollers 11 to progressively move the welding arcs about the circumference of the casing and complete the welding of the seam. This is accomplished by connecting two or more of the rollers 11 which are on frame member 6 with a rotatable shaft 22 driven by gears 23 from a motor 24 on platform 25 of member 6. The speed of the motor 24 may be varied for different welding conditions as where the thickness of the casing and type of joint is changed.

The rotation of the frame about the casing is effected by the friction of the drive rollers on the casing wall. For this purpose it is preferable to have drive rollers 11 knurled to increase the traction with the casing. It is also preferable to have the rollers 11 engage the casing wall with considerable clamping pressure.

The frame members 5, 6 and 7 are hinged together as previously described. For this purpose the central member 6 is provided with horizontal frame elements 26, 27 and 28 disposed in the plane of the radial elements 15. Element 26 is at right angles to the radial element 15 of member 6 and is secured at its center to the upright element of the same member 9. The elements 27 and 28 join the outer end of element 15 with the respective outer ends of element 26.

The frame members 5 and 7 each have laterally extending horizontal elements 29 and 30 which connect the respective ends of elements 15 to the hinges 31 disposed at the ends of the element 26.

Similar hinges 32 are disposed in horizontal bracing elements 33 near the top of the frame members 5, 6 and 7. The hinges 32 are in vertical alignment with the respective hinges 31 to effect uniform opening of the jaws formed by the hinging of members 5 and 7 to member 6.

The frame members 5, 6 and 7 are caused to clamp the casing by any suitable mechanism. Figs. 2 and 3 illustrate the preferred embodiment. In this the member 7 has its vertical element 9 connected by a pivoted rod 34 containing a turnbuckle 35 to the member 6 near the latter's vertical element 9. The turnbuckle 35 serves to adjust the distance between the respective vertical elements 9 for accommodating casing of different sizes.

The frame member 5 has its vertical element 9 connected by a rod 36, similar to rod 34 and containing a turnbuckle 37, to the member 6. The connection of the rod 36 to member 6 is by means of a crank 38 operated by a lever arm 39. The center of the crank 38 is so located with respect to the direction of rod 36 and the arm 39 as to effect an automatic locking of the members in clamping position by the rod 36 just passing dead center of the crank in that position. A removable handle 40 forms an extension for the arm 39 to facilitate manual operation of the clamp. The turnbuckle 37 functions for adjustment the same as turnbuckle 35 and in addition it serves to tighten the clamp when necessary.

In operation, the casing joint 8 being positioned over the well for welding, the frame 1 is swung on its cable 2 to the center of the derrick 3 and members 5 and 7 positioned on either side of the casing. A movement of the handle 40 to operate crank 38 past dead center swings member 5 inward to clamp the casing between the rollers 11. The welding heads 17 are then suitably adjusted in position relative to the seam to be welded and the welding operation started. At the same time the motor 24 is started and the frame with its welding heads slowly rotates about the casing.

Upon completion of the welding the device is quickly removed from the casing by merely moving handle 40 to release the clamping pressure of members 5, 6 and 7 and the device may then be moved to the side of the derrick, out of the way.

Various embodiments of the invention may be made within the scope of the accompanying claims.

The invention is claimed as follows:

1. A device of the class described, comprising a frame having means for clamping vertically disposed casing joints to hold the same in alignment for welding, and means mounted on said frame and engaging the casing for rotating said frame bodily relative to the casing.

2. A device of the class described, comprising a frame having means for clamping vertically disposed casing joints to hold the same in alignment for welding, means for supporting welding equipment on said frame, and rotary means mounted on said frame and engaging the casing for rotating said frame bodily relative to the casing.

3. A device of the class described, comprising frame means for supporting a welding head in operative welding relation to a circumferential seam in vertically disposed casing, said means having a plurality of rollers engaging the casing to provide for relative rotation therebetween, and means mounted on said frame for rotating said first named means and welding head relative to the casing for progressively welding the seam.

4. A device for aligning casing for welding the same, comprising a plurality of jaws pivoted on a common frame gripping the respective ends of the casing and holding the same in alignment, said jaws being mounted on rollers to allow for rotation of the device about the casing during welding.

5. A device for aligning casing for welding the same, comprising a plurality of jaws pivoted on a common frame gripping the respective ends of the casing and holding the same in alignment, said jaws being mounted on rollers to allow for rotation of the device about the casing during welding, means for tieing said jaws together, and means for quickly releasing said jaws simultaneously.

6. A casing aligner, comprising a frame having relatively movable jaw members for receiving the casing, and a plurality of rollers on said members and engaging the casing to hold the same, said rollers having axes parallel to the axes of the casing to allow relative rotation between said frame and the casing.

7. A casing aligner comprising a frame having relatively movable jaw members constructed of vertical and horizontal struts and diagonal braces, said members being hinged to each other, and said frame having rollers engaging the casing to provide for bodily rotation of the frame on the casing, and means including an eccentric pivot mounted on one of said struts for securing said jaws in open or closed position.

8. A portable device for aligning casing for welding and adapted to be suspended for free vertical adjustment in a derrick and for swinging to one side when not in use, comprising relatively movable jaw elements making rolling contact with the casing along at least three circumferentially spaced vertical lines and leaving one side of the casing at the mouth of the jaw unconfined, means for securing said jaws in closed position, and means for adjusting said elements to fit different size casing, said rolling contacts between the jaws and casing providing for relative rotation of the casing in the device.

9. A portable device for aligning casing for welding and adapted to be suspended for free vertical adjustment in a derrick and for swinging to one side when not in use, comprising relatively movable jaw elements making rolling contact with the casing along at least three circumferentially spaced vertical lines and leaving one side of the casing at the mouth of the jaw unconfined and means for securing said jaws in closed position, said rolling contacts between the jaws and casing providing for relative rotation of the casing in the device.

10. A device for aligning casing for welding the same, comprising a plurality of jaws gripping the respective ends of the casing and holding the same in alignment, said jaws being mounted on rollers to allow for rotation of the device about the casing during welding, and means on the device for driving at least one of said rollers in friction contact with the casing to effect relative rotation of the device about the casing.

FIRTH PIERCE.